United States Patent
Baldwin (10) Patent No.: US 9,635,255 B1
(45) Date of Patent: Apr. 25, 2017

(54) DISPLAY AS ADJUSTABLE LIGHT SOURCE

(71) Applicant: Amazon Technologies, Inc., Reno, NV (US)

(72) Inventor: Leo Benedict Baldwin, San Jose, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 162 days.

(21) Appl. No.: 13/906,176

(22) Filed: May 30, 2013

(51) Int. Cl.
*H04N 5/232* (2006.01)

(52) U.S. Cl.
CPC .............................. *H04N 5/23241* (2013.01)

(58) Field of Classification Search
CPC ...... H04N 5/2256; H04N 5/2354; H04N 5/57;
H04N 5/23293; H04N 5/2254; H04N
7/144; H04N 7/142; H04N 5/23241;
G03B 3/3406; G03B 15/05; G09G 3/3426
See application file for complete search history.

(56) References Cited

U.S. PATENT DOCUMENTS

| | | | |
|---|---|---|---|
| 6,687,515 B1 * | 2/2004 | Kosaka | 455/566 |
| 7,652,716 B2 * | 1/2010 | Qiu | H04N 5/2351 348/14.01 |
| 7,705,874 B2 * | 4/2010 | Du Breuil | H04N 7/147 348/14.01 |
| 8,248,519 B2 * | 8/2012 | Liao | 348/370 |
| 8,519,942 B2 * | 8/2013 | Kao | 345/102 |
| 2008/0231545 A1 * | 9/2008 | Gong | |
| 2008/0239158 A1 * | 10/2008 | Wu et al. | 348/677 |
| 2010/0013849 A1 * | 1/2010 | Yun et al. | 345/589 |
| 2011/0014955 A1 * | 1/2011 | Kim | G02F 1/133603 455/566 |
| 2011/0069078 A1 * | 3/2011 | Zhang et al. | 345/589 |
| 2014/0293134 A1 * | 10/2014 | Hung | H04N 5/205 348/624 |

* cited by examiner

*Primary Examiner* — Luong T Nguyen
(74) *Attorney, Agent, or Firm* — Polsinelli LLP (57) ABSTRACT

The quality of images captured by a camera for purposes such as video conferencing and self-portraiture can be improved by adjusting aspects of a display element on a similar side of the device and/or the content displayed on the display element. In situations where additional illumination can help improve image quality, a determination can be made as to whether adjusting a brightness or other such value of a display element can provide sufficient illumination. Also, a determination can be made as to whether adding a frame or border to the content being displayed can help to provide the necessary illumination. An added frame can have a size, brightness, color, or other such aspects needed to provide the illumination. In at least some embodiments the size and brightness of the frame will be based at least in part upon the size and brightness of content displayed within the frame.

18 Claims, 6 Drawing Sheets

DISPLAY AS ADJUSTABLE LIGHT SOURCE

BACKGROUND

People are increasingly using devices such as portable computing devices to perform a variety of tasks. As an example, an increasing number of devices include what are referred to as "front facing" cameras, or cameras that are on the same side of the device as a display element, which enables a user to perform tasks such as self-portrait capture, video conferencing, and video chat. In many of these devices, the front facing camera is intended to be relatively low resolution, due in part to the nature of the tasks generally performed with such a camera. Due to cost, space, and power savings issues as well, the front facing camera is generally intended to be relatively small and inexpensive. Such a design can have various limitations, as the camera can be relatively sensitive to lighting conditions due to the limited sensitivity and other such aspects. While a light source can be added or used to provide light when needed to improve the quality of image capture, such usage can be a significant drain on battery life and in many cases can be undesirable to the user looking in the general direction of the light source.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to capturing images in an electronic environment. In particular, various approaches enable a computing device to utilize a display element as a supplemental light source, for example, in order to improve the quality of captured images (e.g., still or video images). In at least some embodiments, data captured by a front-facing camera, light source, or other such sensor can be analyzed to attempt to determine information relating to image capture, as may include information about the lighting conditions near the device or the quality of image data being captured by a front-facing camera. The quality of an image can be determined using any of a number of image parameters, such as may include the brightness and/or contrast values and/or ranges of an image. Similar approaches can be used with other cameras or sensors elsewhere on the device as well. When it is determined, based at least in part upon the image quality parameters or other such information, that the quality of the image should be improved using additional light, an adjustment can be made to content on the screen, or additional content can be displayed, to attempt to provide at least a portion of the additional light. For example, the brightness or contrast of video (or other graphical elements or content) being displayed on the display element can be increased (or decreased if too much light is being provided). Similarly, a frame or other such element can be displayed that can attempt to provide additional light. The frame can have a thickness, brightness, color, and/or other such aspect determined that can provide the desired amount of light. As lighting conditions change, the presence and/or aspect(s) of the frame can be adjusted to provide a desired amount of light for image capture.

Various other applications, processes and uses are presented below with respect to the various embodiments.

Figure 1A:
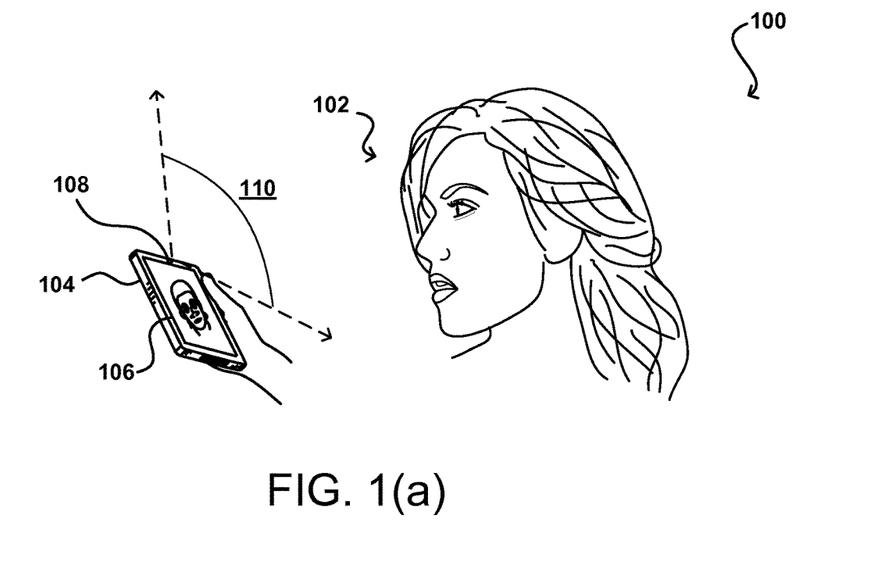
FIGS. 1(a) and 1(b) illustrate an example environment in which a user can utilize a computing device to perform a task such as video conferencing in accordance with various embodiments.

FIG. 1(a) illustrates an example situation 100 wherein a user 102 is engaging in a video chat using a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, smart watches, smart glasses, cellular phones, video gaming consoles or controllers, and portable media players, among others. In this example, the computing device 104 has at least one front-facing camera 108, or other such image capture element, operable to perform functions such as image and/or video capture. Each image capture element may be, for example, a camera, a charge-coupled device (CCD), or a complementary metal-oxide-semiconductor (CMOS) image sensor, or can utilize another image capturing technology. The front-facing camera 108 is on a same side of the computing device 104 as a display element 106, such as a primary display screen, such that the user can be within a field of view 110 of the front-facing camera 108 while viewing video of another user displayed on the display element 106.

Figure 1B:
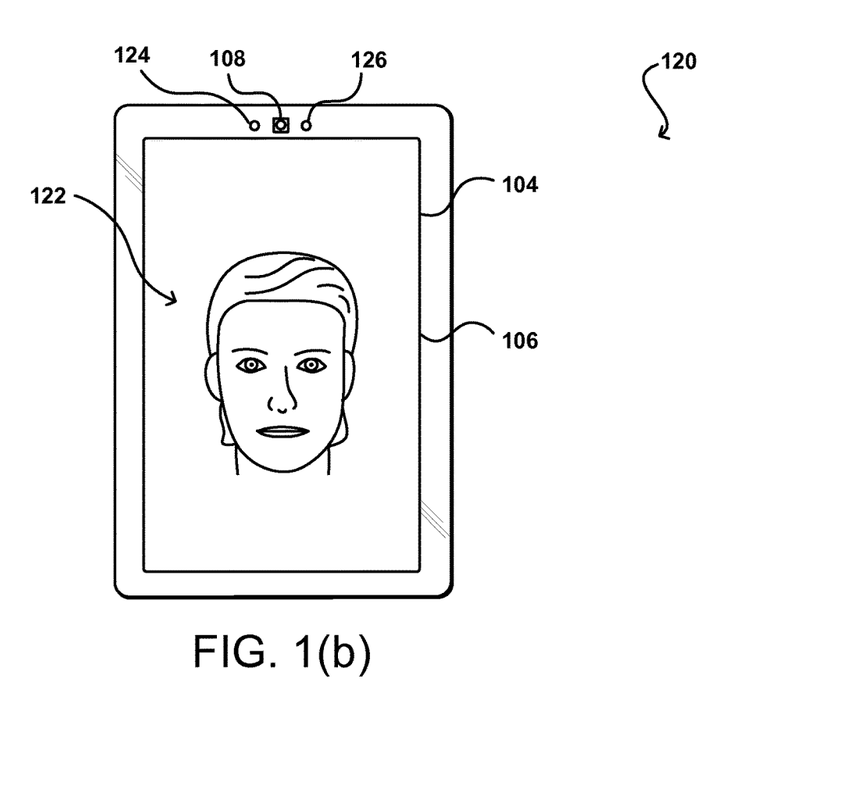

FIG. 1(b) illustrates a front view 120 of the example computing device 104 used for the video chat. As illustrated, the display element 106, in this example an LCD or similar display, is on the same general side of the device as the front-facing camera 108. During the video chat the camera 108 can capture video of the user to be transmitted to a device used by the other party, or parties, to the video chat. Concurrently, video content 122 captured by at least one of the devices for one or more other parties to the video chat can be displayed on the display element 106 of the device such that the user can engage in video chat. Although not illustrated, components such as one or more microphones and one or more speakers typically are used to perform a similar function with respect to audio data, such that the parties to the video chat can hear what each other is saying, in addition to seeing each party in the video chat. In this example, the device 104 includes additional components that can be useful for image capture. For example, the device includes a light sensor 124 that can be used to detect an amount of light in a direction towards the front of the device, which can be used to determine whether the device is in a pocket or held up to an ear, for example, as well as whether additional light is needed for image capture. The example device 104 also includes an illumination element 126, such as a white-light LED, that can be used to provide additional light for image capture.

As discussed, however, constraints such as cost, size, and battery life can prevent certain use of such components on at least some devices. Further, while an illumination source 126 such as a white light LED can be useful for purposes such as self-portrait capture, the continual use of such a light source during a video chat can not only provide a significant drain on the battery, but can also be distracting or irritating to a user who is trying to look at the screen but has the bright light shining relatively directly into the user's eyes. Further, the bright light can cause the display of video 122 on the display element 106 to appear relatively dark. Thus, such approaches may be less than optimal for at least certain functions, if those components are even available.

Approaches in accordance with various embodiments take advantage of the fact that the display element 106 is itself a source of illumination to improve the quality of image capture in low light situations, for example, while having minimal impact on battery power and/or the user experience.

For example, FIG. 2(*a*) illustrates an example situation 200 wherein a display of video content 204 is being presented on a display screen 202 of a computing device. In this example, the video content 204 might be displayed with "default" or other such display parameters, such as default or intermediate brightness and contrast parameters. Since the display screen in this example is a backlit LCD display, the light will be passing through the display toward the user. Accordingly, an amount of illumination will be provided that can reflect from the user and be captured by the front-facing camera 206. The amount of illumination provided can be relatively minimal, however, such that the reflection of the light produced by the display screen 202 might not be adequate for acceptable image quality in video captured by the camera 206 under low ambient illumination imaging conditions.

In at least some embodiments, a determination can be made as to whether additional light should be provided in order to attempt to improve at least one aspect of the captured images and/or video. For example, a light sensor might be used to determine an amount (i.e., an intensity) of light near at least one side of the device, such as over a range of angles near the front of the device. If that amount of light falls below at least one threshold, a determination can be made to provide additional light via the device. In some embodiments, the image data captured by the camera can be analyzed to attempt to determine values for one or more image quality parameters, such as brightness and/or contrast. For example, the value of each pixel, or at least a set of pixels, of the image data can be analyzed to determine an average brightness value, range of brightness values, or other such metric. Similarly, the differences in pixel values can be analyzed to determine an average contrast value, range of contrast values, etc. In some embodiments, a brightness or contrast value falling below a determined threshold, or outside a desired range, can be cause for the device to provide additional illumination. In some embodiments, the device (or software executing on or remote from the device) might have target brightness and contrast values or ranges, and might attempt to determine an amount of illumination needed to bring the image quality values to within those ranges. In some embodiments the auto-exposure values determined for the camera are examined (i.e., shutter speed, gain, aperture value, filter value) to determine if the image quality is optimal, or in some cases even acceptable. Various other approaches can be used as well within the scope of the various embodiments.

Figure 2A:
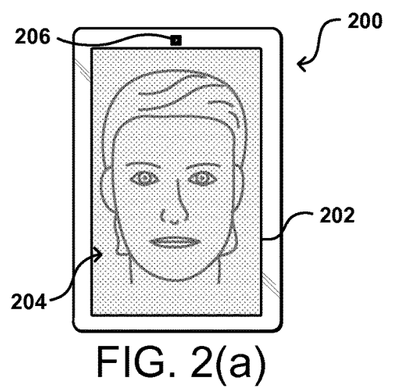
FIGS. 2(a), 2(b), 2(c), 2(d), and 2(e) illustrate example displays that can be used to provide an amount of light for improving image capture in accordance with various embodiments.
Figure 2B:
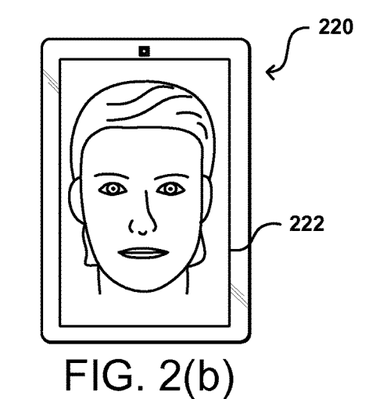

In some embodiments, the display of content on a display screen or other such element can be modified to attempt to provide additional illumination. For example, in the situation 220 of FIG. 2(*b*) the brightness of the display has been increased relative to the level in FIG. 2(*a*). Various approaches can be used to increase the brightness, using software, hardware, or a combination thereof. For example, in an LCD display the backlight brightness can be increased, and/or the overall transmission of the liquid crystal (or similar) layer can be increased. The increased brightness can provide increased illumination in the vicinity of the display screen, which can help to reflect more light from the user and, potentially, result in an improved image capture.

As discussed, however, the brightness, contrast, and other such parameters of the display of content can only be adjusted so far while still retaining acceptable display quality. For example, increasing the brightness too much can cause the displayed content to appear substantially white, with very little contrast, which can be undesirable in many instances. In order for the user to be able to view another party to a video chat with acceptable image quality, for example, there might be maximum brightness and contrast settings, values, or ranges. Thus, there is a limited amount of illumination that can be provided via adjusting parameters of the display and/or content to be displayed.

Figure 2C:
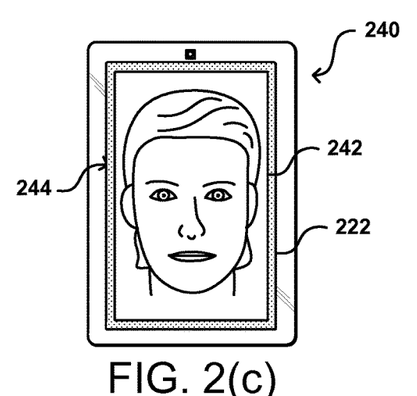

Accordingly, approaches in accordance with various embodiments can attempt to add or modify the displayed content in order to provide additional illumination. For example, the situation 240 illustrated in FIG. 2(*c*) illustrates a frame 244 that has been added around the video window 242 displayed on the display screen 222. While the frame occupies the outer edge of the display screen in this example, it should be understood that the frame can surround a video window that only occupies a portion of the display, can be along one or more sides of a panel displayed on the screen, or can occupy any other appropriate portion and/or location on the display. In this example, the frame 244 has a determined brightness and width, which might be default settings or might be determined dynamically as discussed elsewhere herein. For example, the frame might have a fixed width but variable brightness, a variable width but fixed brightness, or other combinations thereof. In one embodiment, the frame starts with a minimum width and minimum brightness in order to minimize the reduction in size of the video window and to minimize the difference in brightness with respect to the displayed video content. In another embodiment, the frame starts with a minimum or default size, and the brightness of the frame is set to match the average brightness, contrast, or other value of the displayed content. In still other embodiments, the brightness (or color, etc.) of the frame is set to within an allowable range of the brightness of the video content displayed, and the width of the frame is set to provide the desired amount of illumination. Various other approaches can be used as well as discussed and suggested elsewhere herein.

Figure 2D:
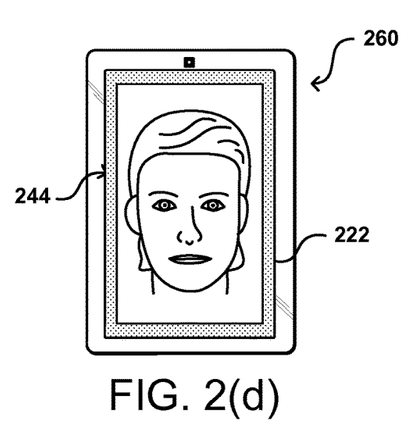
Figure 2E:
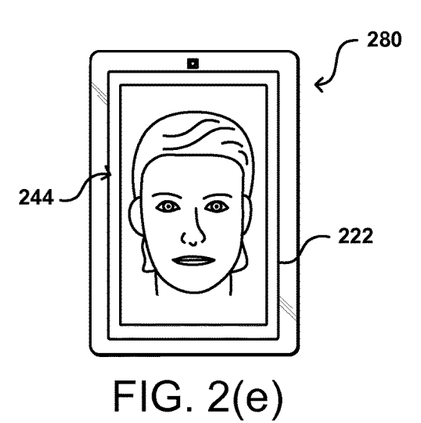

In some embodiments, the thickness of a frame 244 can be used to control the amount of additional illumination provided, as a thicker "white" frame will tend to provide more illumination. For example, in the situation 260 of FIG. 2(*d*) the thickness of the frame 244 has been increased with respect to the situation of FIG. 2(*c*) in order to provide additional illumination. Controlling illumination levels using only frame width might be undesirable in at least some situations, however, as there can be limited real estate of the display and a larger frame requires the video display region (or other region for displaying content) to decrease. For devices such as mobile phone with small displays, it can be undesirable to significantly shrink the content displayed as it then may be difficult for a user to view the content.

In some embodiments, the brightness, intensity, or color of the frame can be used to control the amount of additional illumination provided, as a brighter or "whiter" frame will tend to provide more illumination. For example, in the situation 260 of FIG. 2(d) the thickness of the frame 244 has been increased with respect to the situation of FIG. 2(d) in order to provide additional illumination. Controlling illumination levels using only frame brightness can also be undesirable in at least some situations, as the human eye will adjust to differences in brightness level between the frame and the video content, which might cause the video content to appear relatively dark or of low contrast. Further, since the user will generally be looking at the display, the bright frame can cause discomfort for the user.

As such, approaches in accordance with at least some embodiments can attempt to balance factors such as the size and brightness of the frame, in order to attempt to minimize the impact on the user experience. Further, the presence of a frame can also be balanced with the amount of light that is able to be provided by adjusting the display, and the brightness of the frame can be kept within an allowable deviation or range of the content display. In one embodiment, backlight brightness is first maximized then, if sufficient brightness is not obtained, display brightness is maximized by adjusting the liquid crystal (or similar) portion of the display, and finally an illumination border or element is added. By adding an illumination element to an already brightness-maximized display, the contrast between the image and the frame is minimized.

Figure 3:
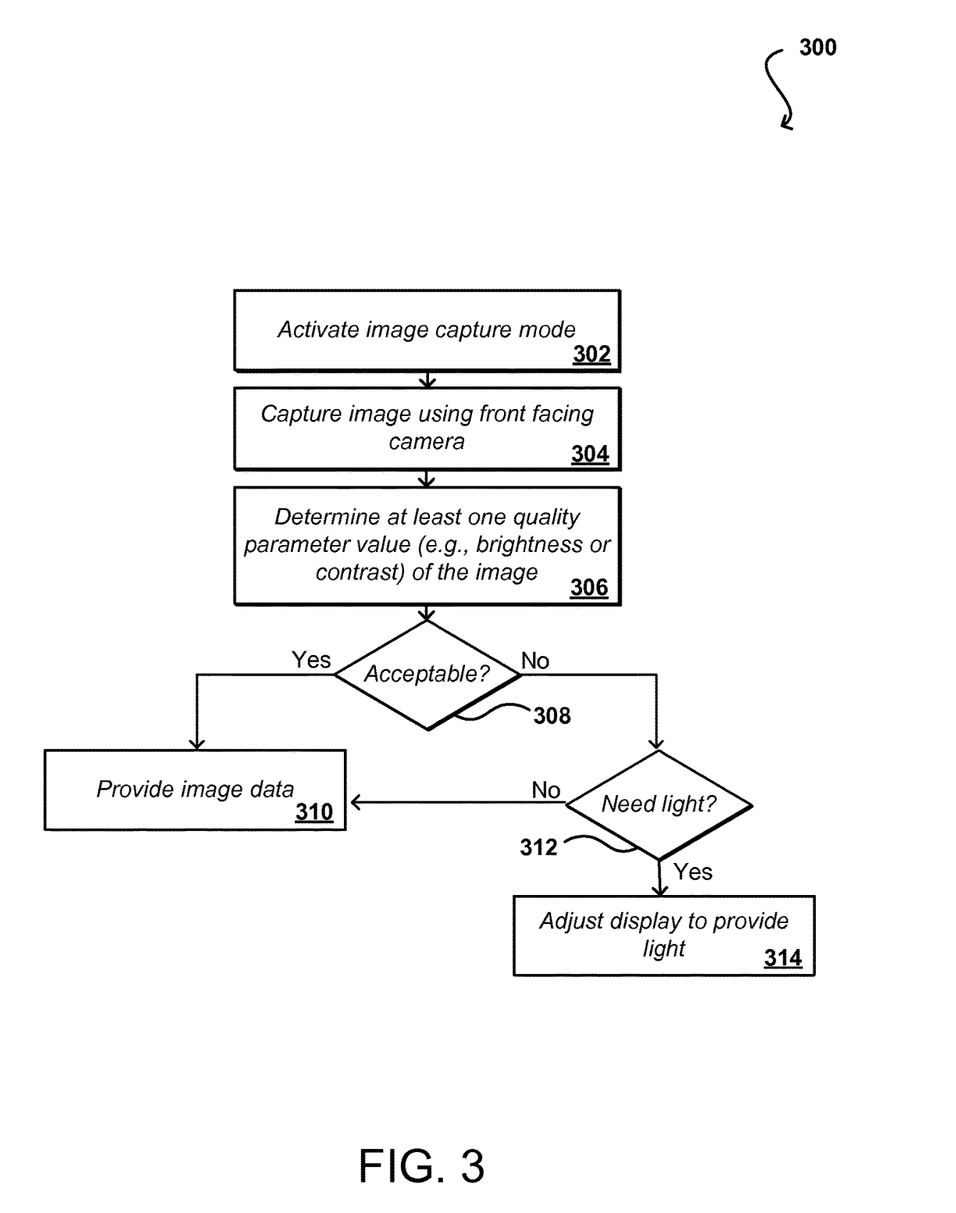
FIG. 3 illustrates an example process for determining whether additional light is needed for image capture and then providing that light by adjusting content displayed on a display element in accordance with various embodiments.

FIG. 3 illustrates an example process 300 for determining whether to provide additional illumination using a display element that can be used in accordance with various embodiments. It should be understood that, for any process discussed herein, there can be additional, fewer, or alternative steps performed in similar or alternative orders, or in parallel, within the scope of the various embodiments unless otherwise stated. In this example, an image capture mode is activated 302 on a computing device. The image capture mode can be activated manually or automatically, such as upon the user launching a self-portrait application or receiving a video chat request. In this example, the image capture mode refers to use of a front-facing camera and a user, although other image capture elements in other locations can be utilized as well. While in the image capture mode, at least one image (or set of image data) is captured 304 using the front-facing camera. This can be a single still digital image, a frame or segment of video, etc. The image can be analyzed to determine 306 the value for at least one quality parameter of the image. For example, the pixel data of the image can be analyzed to attempt to determine a brightness level or contrast level of the image as a whole of portions of the image, etc. As mentioned, in other embodiments the exposure settings (or similar values) that can be obtained from the camera can be used instead, as may include brightness or contrast levels, white balance level, aperture settings, filter settings, and the like. If the value(s) of the quality parameter (s) are determined 308 to be of an acceptable value or within an acceptable range, the image data can be provided 310 for its intended use, such as to be stored for a self-portrait image or to be sent to another device as part of a video chat. If at least one image parameter value of the image is determined to be outside a desired range, for example, another determination can be made 312 (separately or as part of the acceptability determination) as to whether additional light may help to bring the at least one image parameter value to within an acceptable range. For example, if the brightness or light value of the image is below a desired range, additional illumination might be able to assist in improving the brightness or light value. If the image is too bright, and no frame is being displayed, then there might not be any adjustment that can be made (depending upon factors such as current display brightness, etc.). If additional illumination is determined to potentially be able to bring the image parameter values for subsequent images to within a desired range, then one or more aspects of the display can be adjusted 314 to attempt to provide the necessary illumination. As discussed, this can include adjusting a backlight layer to a maximum level in one embodiment, followed by adjusting a brightness or contrast level of a liquid crystal (or similar) layer of the display. For screens such as OLED screens, this can include adjusting a brightness or contrast of the OLED layer, among other such options.

Figure 4:
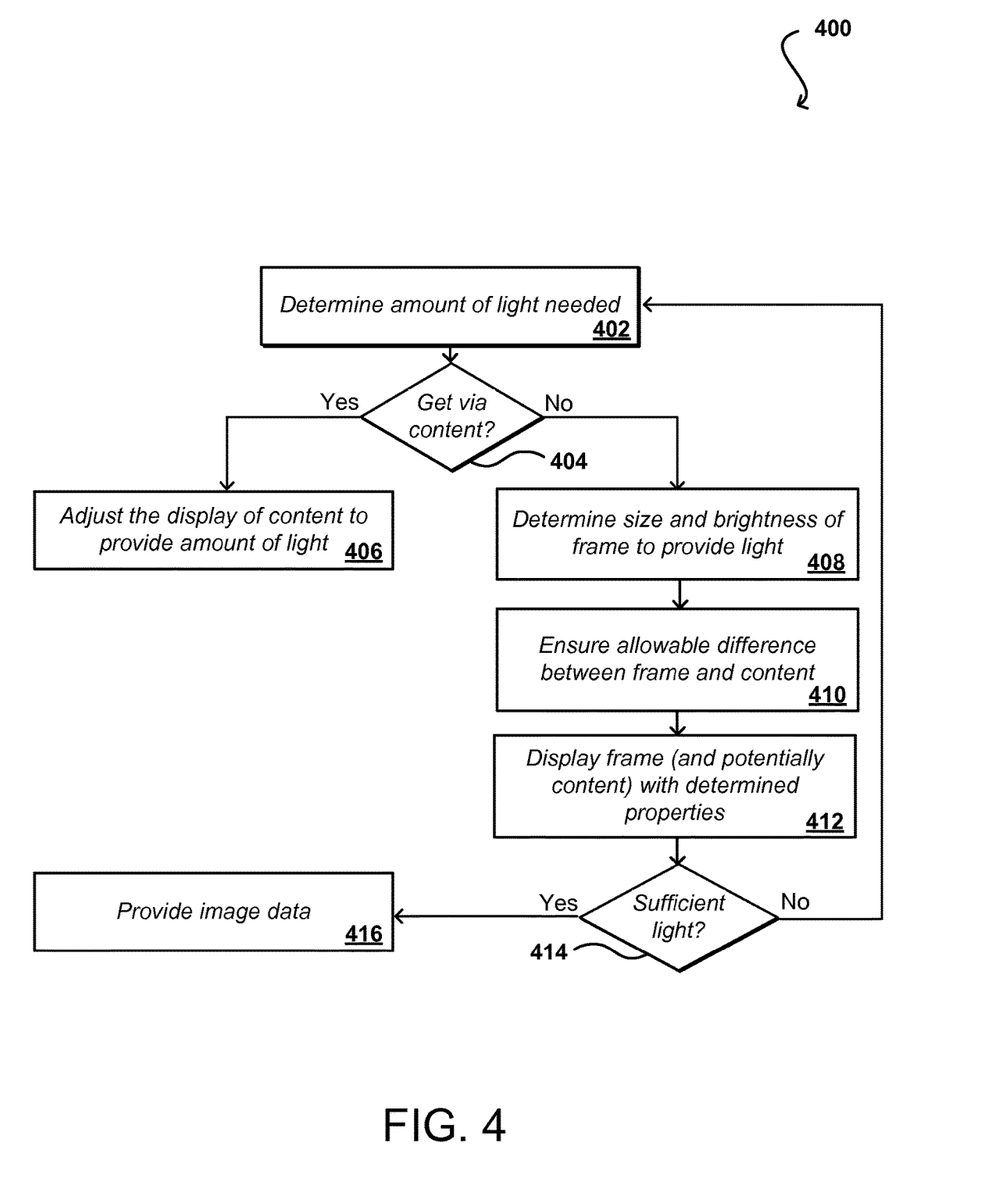
FIG. 4 illustrates an example process for adjusting a display of content to change an amount of light provided that can be used in accordance with various embodiments.

FIG. 4 illustrates an example process 400 for dynamically adjusting the display of content to provide a desired amount of illumination that can be utilized in accordance with various embodiments. In this example, an amount of light that is needed to cause images captured by a camera to have an acceptable image quality (e.g., brightness and contrast) is determined 402, such as by using a process discussed above with respect to FIG. 3. In this example, a determination is made 404 as to whether the desired amount of illumination can be provided by adjusting one or more aspects of the content currently being displayed. This can include, for example, adjusting a brightness or contrast of video content being displayed on the display screen. If the desired amount of illumination can be provided using such an approach, with the adjustment causing the display of content to still have acceptable display characteristics, then the display of content can be adjusted 406 dynamically to provide the desired amount of illumination. In some embodiments, the backlight brightness can be increased and/or maximized for LCD type screens or the screen brightness can be increased or maximized for OLED type screens. Increasing the display of content can also be limited by the type of content being displayed. For example, if video coming from another device is dark and of low contrast, the ability to increase the brightness without losing contrast or enhancing noise may be limited. Other factors such as other open windows, wallpaper, or other type of content or elements being displayed can also affect the ability to provide additional illumination.

If the amount of illumination cannot be provided through adjustment of the display of content alone, then a determination can be made 408 as to the size (e.g., thickness), location, and brightness of a frame, border, or other such additional feature for the video window, or other such display element, in order to obtain the desired amount of illumination. For example, a display frame of fifteen pixels in width around a video window might be set to bright white (e.g., an RGB value of 255, 255, 255) or another such value. A determination can be made 410 to ensure that the differences (e.g., brightness and contrast) between the frame and the content to be displayed are within an allowable range. For example, it might be desirable to have the brightness of the displayed content at least 25% as bright as the frame in order to prevent washing out the viewing of content. In some embodiments the peak intensity or brightness values can be determined for the video window, or other display of content, and of those values fall well below the value of the frame then a brightness boost might be added to the video content while maintaining the brightness of the frame. In some embodiments, the display of content is adjusted until the peak values of the video content, for example, are substantially equal to the brightness of the frame, with other values being keyed from the similar brightness values. In at least some embodiments the amount that the brightness of a dark image can be increased is limited to at least some extent by noise, as the noise in a dark image can begin to dominate upon significant increases in brightness. The acceptable level can depend upon factors such as the characteristic of the camera sensor.

If the differences are not within an allowable range, an adjustment can be made to at least one of the content and the frame in order to provide such allowable differences. The frame can then be displayed 412 with the content, with the frame and/or content having the determined properties to provide the determined amount of illumination. A subsequently captured image can be analyzed 414 to determine if the additional light was sufficient to bring the captured image parameters to within an acceptable range of values. If not, another determination and adjustment can be made. The process can continue until the desired image quality is obtained for the captured image(s), and the quality can periodically be checked to determine if additional changes are needed due to changing lighting conditions or other such factors. If sufficient image quality parameters are obtained via the adjusted amount of illumination, the image data can be provided 416 for the intended purpose, such as video chat, etc.

Various other factors can be analyzed and/or utilized to determine amounts by which the brightness of the display should be altered and/or a frame or other such element should be added to the content displayed. For example, factors such as the amount of available real estate on the display and the overall size or resolution of the display can be utilized to determine a maximum amount of area that can be used to add a frame or other element(s) to the displayed content, as adding a large frame can cause the other content displayed to have to be displayed in a smaller area, which can then make it difficult for a user to view that content. Similarly, surrounding environmental conditions such as the amount of background light can influence the brightness range of the display, as different brightness levels can be acceptable in broad daylight than for a dark room. Similarly, a user might specify, directly or indirectly through various actions, that certain brightness levels or frame sizes are allowable or unacceptable. For example, a user might manually decrease the brightness of a display any time the brightness is increased above a certain level, which can be used to infer the maximum brightness that is acceptable to that user. Similarly, if a user increases a video window size or decreases a frame size when the frame width exceeds a certain value, that value can be used as a variation limit as well. Various other actions or information can be used to determine acceptable ranges as well within the scope of the various embodiments.

For applications where the ability to discern content on the screen is not important, additional regions and/or brightness options might be available as well. For example, a user wanting to take a self-portrait using a front-facing camera might want to be able to view the content on the screen in order to properly position the device relative to the user, but may not care about being able to view the screen during the short period of time when the camera is actually capturing the image. In such a situation, the device might be able to "flash" most or all of the display element, such as by quickly displaying a solid bright white screen, in order to provide the additional illumination only when needed. Similarly screen flashes can be used for other purposes as well, as is known for light flashing, such as red-eye reduction and dynamic camera setting adjustment. For video portraits where the user might still want to be able to view content on the screen during image capture, areas of the screen used for text or other feedback or input (e.g., chat boxes, controls, or virtual buttons) can utilize a scheme of bright-white background (or other appropriate colors or settings) with text or symbols in black or a darker color. Such an approach can help to maximize the amount of screen-light falling on the user to illuminate the user's face for video portrait capture.

In some embodiments other aspects of a frame or additional element can be adjusted as well. For example, the color of a frame might be adjusted to balance out the color of the captured images. For example, in certain lighting conditions the captured images might appear slightly blue. Accordingly, a frame might be produced that is slightly red and/or green, for example, which can attempt to balance out the blue tint. Similarly, the frame might have a color or pattern selected to match a background or theme of the display, in order to make it easier on the eyes of the user and/or have the frame blend in more seamlessly with other content on the display.

Aspects of various embodiments can be implemented in a number of different ways. For example, the functionality can be provided in an application that is downloaded and installed on the computing device. In some embodiments, at least some of the functionality can be implemented in the operating system on the device. In still other embodiments, at least some of the functionality can be implemented in the camera assembly of the computing device, or can be provided through the cloud via a network connection to one or more remote systems or services. Various other approaches can be used as well.

Figure 5:
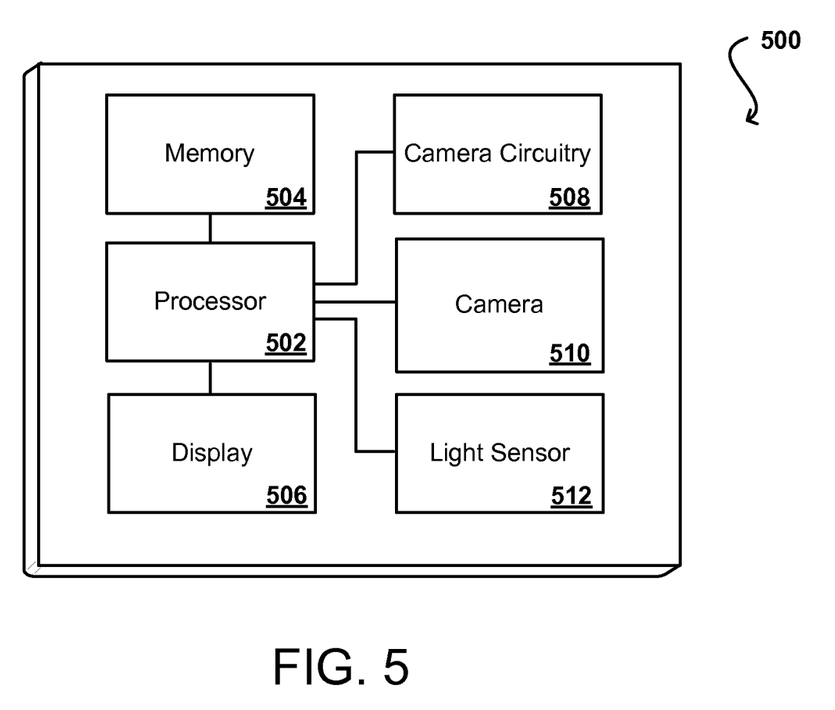
FIG. 5 illustrates an example set of components of a computing device that can be utilized in accordance with various embodiments.

In order to provide various functionality described herein, FIG. 5 illustrates an example set of basic components of a computing device 500, such as the device 104 described with respect to FIG. 1. In this example, the device includes at least one central processor 502 for executing instructions that can be stored in at least one memory device or element 504. As would be apparent to one of ordinary skill in the art, the device can include many types of memory, data storage or computer-readable storage media, such as a first data storage for program instructions for execution by the processor 502, the same or separate storage can be used for images or data, a removable storage memory can be available for sharing information with other devices, etc. The device typically will include some type of display element 506, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 510, such as one or more front-facing cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can include camera control circuitry 508, which in at least some embodiments can attempt to determine one or more image quality values and attempt to adjust the camera sensitivity, gain, or other such parameters to attempt to improve the quality of subsequently captured images. The device also can include at least one light sensor 512 for detecting ambient light or intensity.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 6:
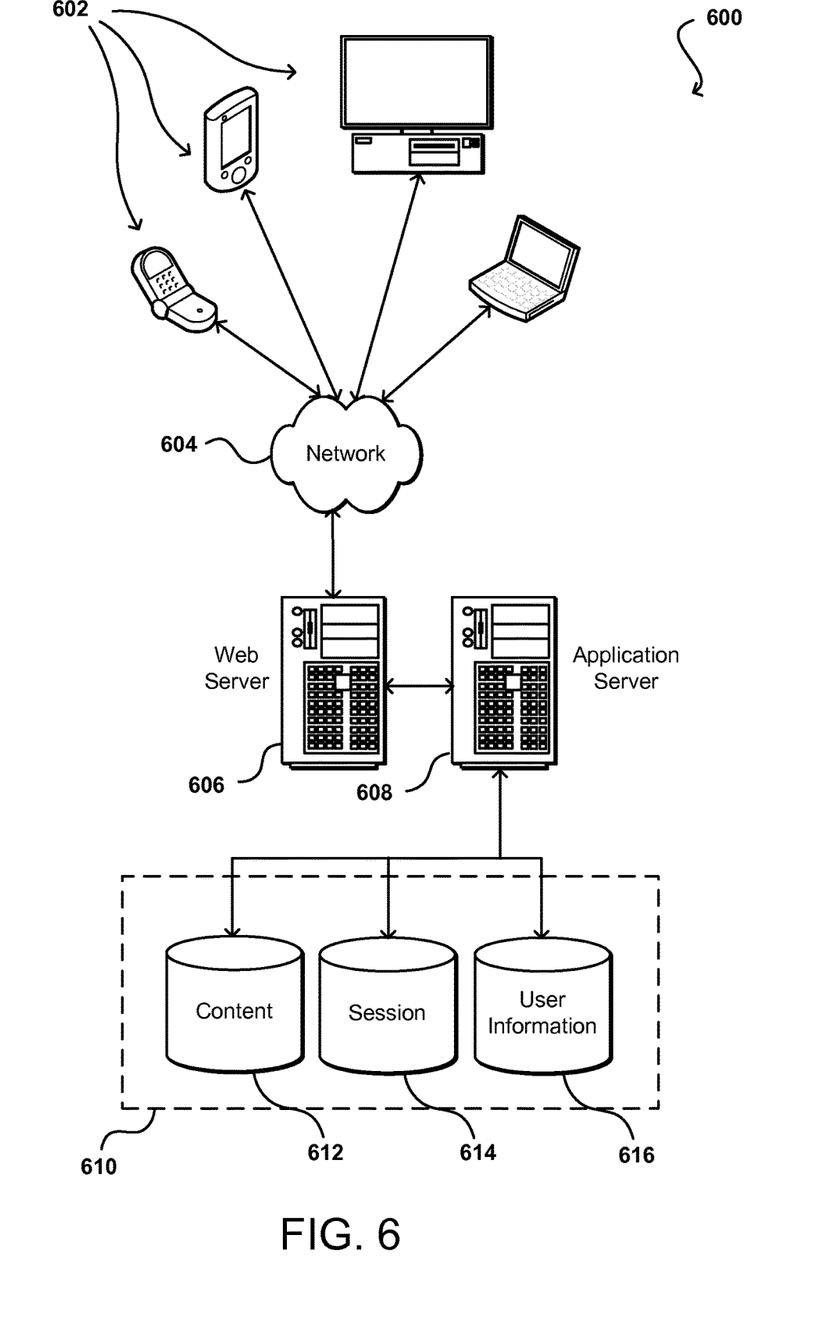
FIG. 6 illustrates an example environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 608 can include any appropriate hardware and software for integrating with the data store 610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 606 in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., production data) 612 and user information 616, which can be used to serve content for the production side. The data store is also shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium including instructions that, when executed by at least one processor of a computing device, cause the computing device to:

capture a first image using a camera of the computing device, the camera is located on a same side of the computing device as a display screen of the computing device;

determine, based at least in part upon a first quality value for the first image, to provide supplemental light to bring a second quality value for a second image within an acceptable range;

increase a brightness level of one or more backlights associated with the display screen to provide at least a first portion of the supplemental light;

using an outer edge of the display screen as a source of illumination, provide a second portion of the supplemental light having a width and at least one of a thickness, or a color value; and adjust the width of the second portion of the supplemental light to bring the second quality value for the second image within the acceptable range.

2. The non-transitory computer-readable storage medium of claim 1, wherein the instructions when executed further cause the computing device to:

adjust a second brightness level of content displayed on the display screen within an allowable brightness deviation from the second portion of the supplemental light.

3. The non-transitory computer-readable storage medium of claim 1, wherein the instructions when executed further cause the computing device to:

determine, based at least in part upon the second quality value for the second image, to provide additional supplemental light to bring a third quality value for a subsequent image within the acceptable range; and adjust at least one of the thickness, or a color value of the second portion of the supplemental light to provide the additional supplemental light.

4. The non-transitory computer-readable storage medium of claim 1, wherein the instructions when executed further cause the computing device to:

determine the supplemental light causes the second quality value to exceed the acceptable range; and reduce the brightness level of the one or more backlights.

5. A method, comprising:

analyzing first image data captured by a camera of a computing device to determine a quality value for the first image data;

determining to provide supplemental light for capturing second image data, the supplemental light directed toward at least one object represented in the second image data;

increasing a brightness level of one or more backlights associated with a display screen of the computing device to provide a first portion of the supplemental light;

using an outer edge of the display screen to provide a second portion of the supplemental light, the second portion of the supplemental light having at least a width and a variable thickness; and adjusting the width to modify the second portion of the supplemental light provided by the outer edge of the display screen.

6. The method of claim 5, wherein the quality value for the first image data includes at least one of a brightness, a contrast, an exposure interval, a gain setting, a white balance setting, an aperture setting, a filter setting, or a level of noise.

7. The method of claim 5, further comprising:

determining at least one of a shape, the variable thickness, a color, or a brightness of the second portion of the supplemental light.

8. The method of claim 5, wherein the second portion of the supplemental light is a frame displayed along the outer edge of the display screen.

9. The method of claim 5, further comprising:

reducing a size of a video chat window by an amount corresponding to an area of the second portion of the supplemental light.

10. The method of claim 9, wherein at least one of the size of the video chat window, or a brightness of the second portion of the supplemental light has at least one of a maximum allowable value or a minimum allowable value, at least one of the maximum allowable value or the minimum allowable value being adjustable based upon information provided by a user of the computing device.

11. The method of claim 9, further comprising:

adjusting a brightness level of the video chat window within an allowable brightness deviation from the second portion of the supplemental light.

12. The method of claim 5, further comprising:

adjusting at least one of a shape, the variable thickness, a color, or a brightness of the second portion of the supplemental light to keep a second quality value for the second image data within an acceptable range.

13. A computing device, comprising:

at least one processor;

a display element;

a camera; and memory including instructions that, when executed by the at least one processor, cause the computing device to:

capture first image data using the camera;

analyze the first image data to determine at least one quality value of the first image data;

determine, using the at least one quality value, to provide supplemental light for capturing second image data;

increase a brightness level of one or more backlights associated with the display element to provide at least a first portion of the supplemental light; and using an outer edge of the display element as a source of illumination, display a second portion of the supplemental light having a width and at least one of a thickness, or a color value; and adjust the width of the second portion of the supplemental light to modify the supplemental light provided by outer edge of the display element.

14. The computing device of claim 13, wherein the display element is a primary display screen of the computing device and the camera is a front-facing camera on a same side of the computing device as the primary display screen.

15. The computing device of claim 13, wherein the second portion of the supplemental light comprises at least one graphical frame displayed along the outer edge of the display element.

16. The computing device of claim 15, wherein the instructions when executed further cause the computing device to:

adjust a second brightness level of the at least one graphical frame to keep a second quality value for the second image data within an acceptable range.

17. The non-transitory computer-readable storage medium of claim 1, wherein the instructions, when executed by the at least one processor, further cause the computing device to:

adjust the thickness of the second portion of the supplemental light to bring the second quality value for the second image within the acceptable range.

18. The computing device of claim 13, wherein the instructions, when executed by the at least one processor, further cause the computing device to:

adjust the thickness of the second portion of the supplemental light to modify the supplemental light provided by outer edge of the display element.

* * * * *